United States Patent [19]

Kawamura et al.

[11] Patent Number: 4,928,230

[45] Date of Patent: May 22, 1990

[54] AUTOMATIC TRANSACTING APPARATUS

[75] Inventors: Shigemi Kawamura; Masahide Yamauchi, both of Kanagawa, Japan

[73] Assignee: Kabushiki Kaisha Toshiba, Japan

[21] Appl. No.: 172,163

[22] Filed: Mar. 23, 1988

[30] Foreign Application Priority Data

| | | | |
|---|---|---|---|
| Mar. 23, 1987 | [JP] | Japan | 62-68675 |
| Mar. 23, 1987 | [JP] | Japan | 62-68676 |
| Apr. 20, 1987 | [JP] | Japan | 62-98417 |
| Apr. 20, 1987 | [JP] | Japan | 62-98419 |

[51] Int. Cl.[5] .......... G06F 15/30

[52] U.S. Cl. .......... 364/479; 209/534; 221/21; 235/379; 902/38

[58] Field of Search .......... 364/478, 479; 221/2, 221/21; 209/534, 546, 549, 552; 235/379, 381, 475–477, 481; 271/256–263, 902; 902/38, 39

[56] References Cited

U.S. PATENT DOCUMENTS

| | | | |
|---|---|---|---|
| 3,795,343 | 3/1974 | Shigemori et al. | 221/21 X |
| 3,828,673 | 8/1974 | Gazzola et al. | 271/257 X |
| 4,470,496 | 9/1984 | Steiner | 235/379 X |
| 4,542,287 | 9/1985 | Watanabe | 235/379 |

*Primary Examiner*—Joseph Ruggiero

[57] ABSTRACT

A paper document transacting apparatus for storing and extracting a paper document into and out of storages through a transporting unit. The apparatus comprises a detector for detecting a transporting condition of the paper document, an indicator for indicating an abnormal transport position of the document, a control switch for controlling a transporting unit, and a controller for controlling the indicator such that, when the abnormal transport position is detected, at least a leading abnormal transport position in a transporting direction out of abnormal transport positions is indicated as well as driving the transporting unit at a low speed according to a signal from the control switch.

According to another embodiment, a paper document transacting apparatus comprises a transporting unit capable of being pulled out of the paper document transacting apparatus, a driving device for driving the transporting unit at a low speed or at a normal speed, first and second switches provided in the transporting unit to change their ON and OFF states according to whether the transporting unit is pulled in or out of the paper document transacting apparatus, and a third switch for instructing the driving device of a low-speed operation.

11 Claims, 12 Drawing Sheets

AUTOMATIC TRANSACTING APPARATUS

BACKGROUND OF THE INVENTION

1. Field of the invention

The present invention relates to a paper document transacting apparatus for receiving and dispensing bills and notes, and particularly to an automatic transacting apparatus of a bill circulating type.

2. Description of the Prior Art

Paper apparatuses are widely used for receiving bills inserted in their inserting ports, transporting the bills through transporting paths, and storing the bills in their storages such as charging storages, 10,000-yen bill storages, 1,000-yen bill storages, 5,000-yen bill storages and reject storages To dispense the bills, each apparatus extracts bills from the storages, transports the same through the transporting path, and dispenses them via the deposit port.

The transporting path of the automatic transacting apparatus tends to cause abnormalities such as jams which prevent bills from moving smoothly. The automatic transacting apparatus is generally equipped with detectors disposed in the transporting path. When detecting the jams, the detectors generate signals according to which indications are made to inform the operator of the occurrence of the jams.

A prior system is disclosed in U.S. Pat. No. 4,542,287 owned by the same assignee as the present invention. In this device, the detector has detected the occurrence of the jams, indicating lamps and digital display section display the error code number However, when the bills are jammed, an operator must open a door and find the location of the jammed bills, causing problems in that a long time is needed for the correction work.

Further, in the prior art apparatus, the transport path drive is used for discharging the remaining bills. At this time, the transport path drives at a normal speed accompanied by the high-speed rotation of mechanical parts such as belts and pulleys of the rollers, endangering the safety of the operator because parts might bite fingers and clothes of the operator.

To insure the safety of the operator in correcting the jam, it is required to prohibit the apparatus from running at the normal speed or turn off power of a transporting unit of the apparatus.

However, in a general maintenance operation other than the jam restoring operation, it is required to take the transporting unit out of the automatic transacting apparatus and drive the transporting unit at the normal speed. To achieve this, the conventional paper document transacting apparatus is provided with interlock switches.

If the jam is corrected by manually rotating the transporting unit, only one interlock switch is sufficient to secure the safety of the operator but the manual jam correction is laborious and inefficient.

Therefore, in correcting the jam, it is required to drive the transporting unit at a low speed to improve the efficiency of the jam correction and ensure the safety of operator.

SUMMARY OF THE INVENTION

An object of the present invention is to provide a paper document transacting apparatus which is easy, safe, reliable and efficient in correcting abnormalities.

In order to accomplish the object mentioned in the above, one aspect of the present invention provides a paper document transacting apparatus comprising a detector for detecting a transporting condition of a paper document, an indicator for indicating an abnormal transport position, a control switch for controlling a transporting unit, and a controller for controlling the indicator such that, when abnormal transport positions are detected, at least a leading abnormal transport position in a transporting direction out of the abnormal transport positions is indicated as well as controlling the speed of the transporting unit according to a signal from the control switch.

According to another embodiment of the present invention, there is provided a paper document transacting apparatus for storing and extracting a paper document into and from storages through a transporting unit, comprising a detector for detecting a transporting condition of the paper document, a judging device for judging according to a signal from the detector whether or not an abnormal transport position exists, an indicator for indicating the transporting condition of the paper document, a control switch for generating a control signal for the transporting unit, and a controller for controlling the indicator such that, when abnormal transport positions are judged by the judging device, at least a leading abnormal transport position in a transporting direction out of the abnormal transport positions is indicated as well as driving the transporting unit at a low speed according to a signal from the control switch to collect the paper document remaining in the transporting unit in a predetermined place.

According to yet another embodiment of the present invention, there is provided a paper document transacting apparatus comprising a transporting unit removably received in the paper document transacting apparatus, a driving device for driving the transporting unit at a low speed or at a normal speed, first and second switches provided for the transporting unit to change their on and off states according to whether the transporting unit is pulled out of or received into the paper document transacting apparatus, and a third switch for instructing the driving device of a low-speed operation.

BRIEF DESCRIPTION OF THE DRAWINGS

The other objects, features and advantages of the present invention will become more apparent from the following descriptions of the preferred embodiments taken in conjunction with the accompanying drawings in which.

DETAILED DESCRIPTION OF THE PREFERRED EMBODIMENTS

The embodiments of the present invention will now be described in detail with reference to the drawings.

Figure 1:
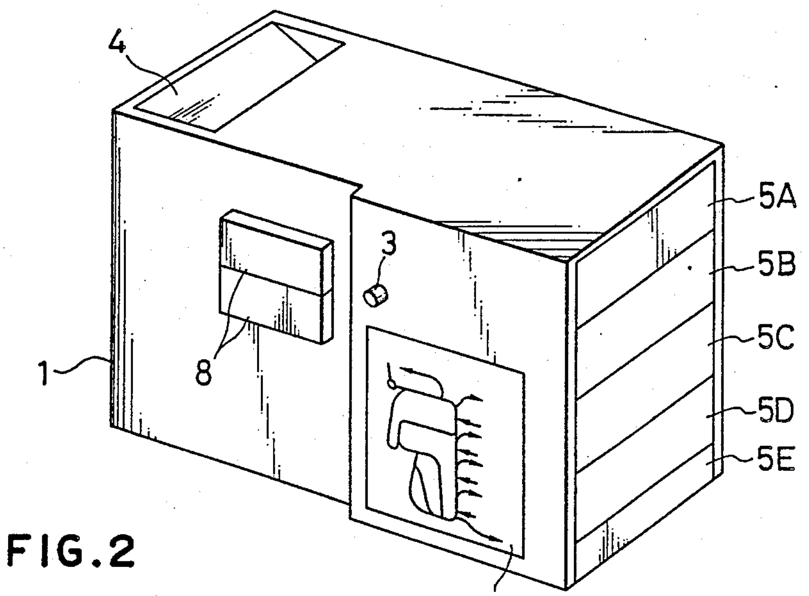
FIG. 1 is a perspective view showing a first embodiment of the present invention.

FIG. 1 is a perspective view showing a paper document transacting apparatus according to a first embodiment of the present invention. In the figure, a numeral 1 represents the paper document transacting apparatus which comprises a monitoring unit to be described later, a reversing portion, a motor and storages such as a charging storage, a 10,000-yen bill storage, a 1,000-yen bill storage, a 5,000-yen bill storage (a damaged bill storage) and a reject storage. A deposit port 4 is disposed on an upper surface of the paper document transacting apparatus 1. On a front surface of the apparatus 1, there are disposed an indication panel 2, a control switch 3 manually operated for controlling a transporting unit, and an inspection door 8 for inspecting the monitoring unit and a reversing portion. On a side surface of the apparatus 1, there are disposed doors 5A to 5E for inspecting the storages.

Figure 2:
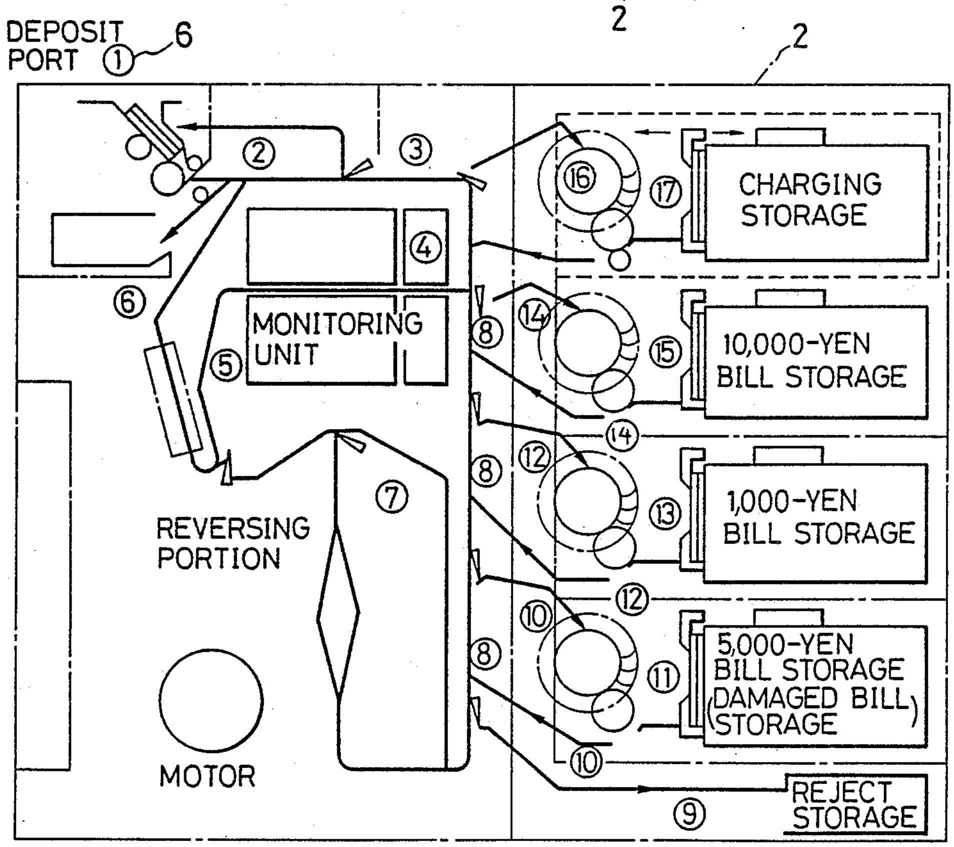
FIG. 2 is a front view showing an example of an indication panel of the embodiment shown in FIG. 1.

The indication panel 2 will be described in detail with reference to FIG. 2. The indication panel 2 indicates a pattern of the transporting unit and patterns and letters representing the monitoring unit, motor and storages. The panel 2 is provided with a plurality of indication elements 6 (represented by numerals 1 to 17 respectively) consisting of light emitting diodes which are turned on when corresponding positions cause transport abnormalities. Sensors are disposed in the apparatus 1 at positions corresponding to the positions of the indication elements 6.

Figure 3:
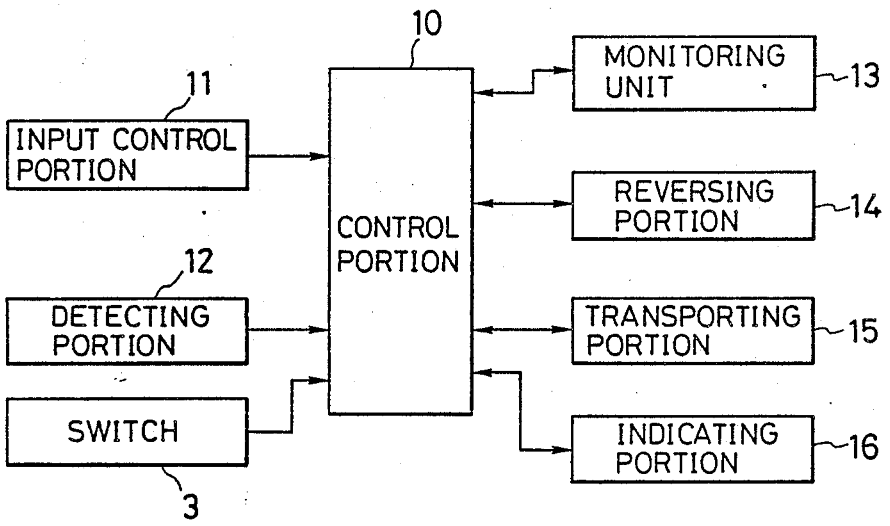
FIG. 3 is a block diagram showing a control system.

FIG. 3 is a block diagram showing a controlling system of the apparatus 1. A numeral 10 represents a controlling portion for controlling respective portions. The control portion 10 is connected to the control switch 3 for controlling the transporting unit, an input control portion 11 to which a customer inputs dispensing and depositing instructions, a detecting portion 12 including the sensors, the monitoring unit 13, the reversing portion 14, a transporting portion 15 including the transporting unit and a driving portion, and an indicating portion 16 including the indication panel 2.

The controlling portion 10 receives a signal from the detecting portion 12 to judge that transport abnormalities have occurred, and identifies the abnormal transport positions to control the indicating portion 16 such that only a leading abnormal transport position among the transport abnormal positions is indicated.

When the control switch 3 is activated, the controlling portion 10 receives a signal from the switch 3 to drive the transporting unit to collect bills remaining in the transporting unit into a predetermined place such as storages close to the positions where the bills are remaining. At this time, the controlling portion 10 controls the transporting unit to drive at a low speed to smoothly collect the remaining bills.

In addition, when the switch 3 is activated, the controlling portion 10 controls the indicating portion 16 such that the remaining bill positions instead of the leading transport abnormal position are indicated on the indication panel 2. Therefore, with the activation of the switch 3, the transporting unit is driven at a low speed, and the transporting state of the remaining bills is visualized.

Figure 4:
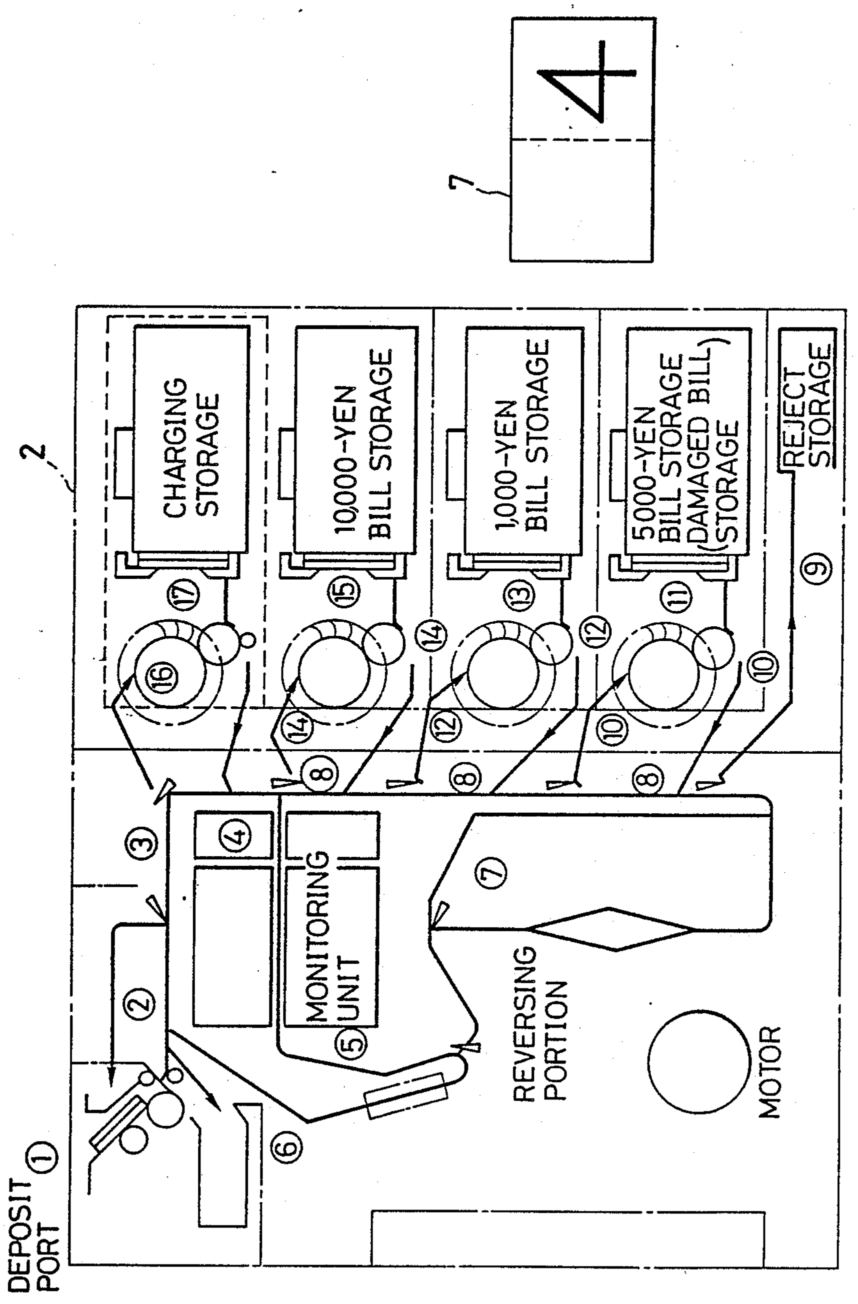
FIG. 4 is a front view showing another example of the indication panel.

FIG. 4 is a view showing a modification of the indicating portion 16. On the side of the indication panel 2, there is provided a numeric indicating portion 7 which comprises eight segments of liquid crystal or light emitting diodes. A number indicated on the numeric indicating portion 7 represents a leading jam position. When the control switch 3 is activated, the next jam positions (or remaining bill indicated positions) are sequentially indicated on the numeric indicating portion 7.

The operation of the paper document transacting apparatus 1 will be described with reference to FIGS. 5 and 6.

Figure 5:
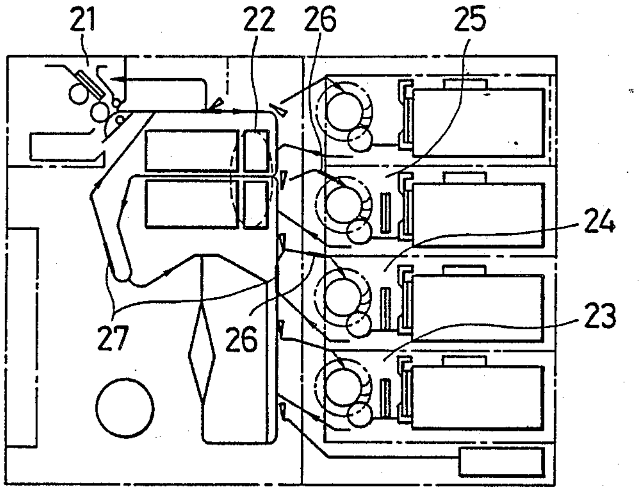
FIGS. 5 and 6 are front views showing an operation of the embodiment.
Figure 6:
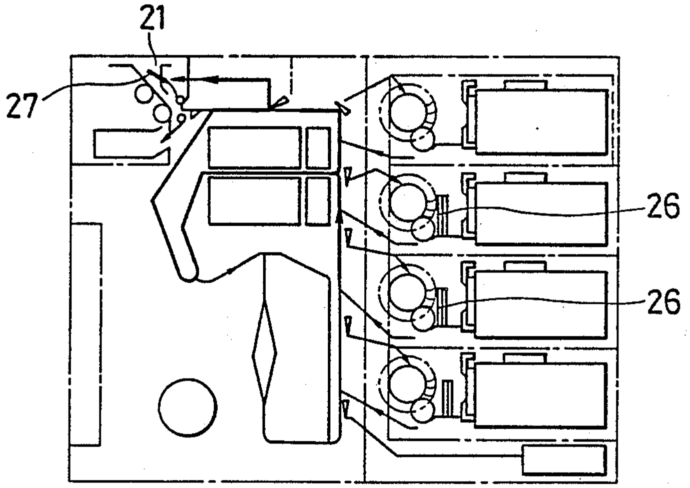

It is supposed that a leading jam position among a plurality of jam positions is a position 22 shown in FIG. 5. This position 22 corresponds to the monitoring unit 13, i.e., a position 4 on the indication panel 2 so that a light emitting diode of the position 4 is turned on while the numeric indicating portion 7 shown in FIG. 4 indicates a number "4". Thus, an operator quickly opens the inspection door 8 to remove the jammed bills. At this time, the transporting unit is stopping.

After removing the jammed bills, the operator may push the switch 3 to drive the transporting unit at a low speed by the control of the controlling portion 10, collecting remaining bills into a predetermined place. Namely, bills 26 remaining in the vicinity of the storages are collected into a 5,000-yen bill storage 23, a 1,000-yen bill storage 24 and a 10,000-yen bill storage 25 respectively, while bills 27 remaining in the vicinity of a deposit port 21 into the deposit port 21 as shown in FIG. 6.

When the control switch 3 is operated, the indication of the indicating portion 16 is shifted to indicate the next jam position or the next remaining bill position so that, while the switch 3 is being operated, the bill collecting state can be visualized. After operation of switch 3, the operator collects the bills from the respective collecting positions, completing the jam correcting process. After that, the operator may operate a reset button (not shown) to restart the normal operation of the paper document transacting apparatus.

As described in the above, instead of indicating all the jam positions, only a leading jam position in a transporting direction is indicated so that, if the operator removes the jammed bills from the leading jam position, the other bills may be transported and collected with the operation of the control switch 3. At this time, the transporting unit is driven at a low speed, and the bill remaining positions are successively indicated so that the remaining bills can easily be confirmed and removed.

The embodiment mentioned in the above is applicable for handling various bills and notes.

In the embodiment of the present invention mentioned in the above, a leading abnormal position is indicated, and a transporting unit is driven at a low speed by the operation of a control switch. Therefore, the abnormality can quickly be resolved without opening many inspection doors which tend to be left open as in the case of the prior art.

Figure 7:
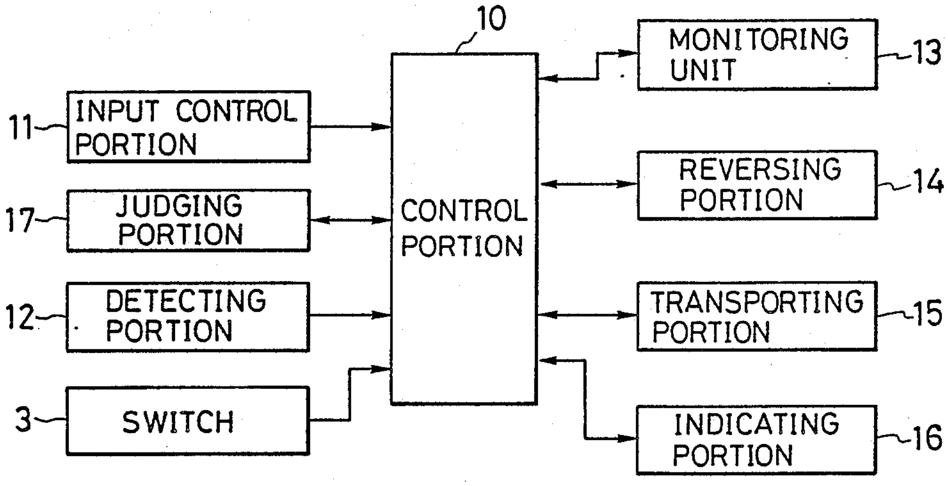
FIG. 7 is a block diagram showing a control system according to a second embodiment of the present invention.

FIG. 7 is a block diagram showing a paper document transacting apparatus according to a second embodiment of the present invention.

The paper document transacting apparatus is provided with a judging portion 17 which judges according to a signal from a detecting portion 12 whether or not abnormalities have occurred in a transporting unit of the apparatus. Other portions of the second embodiment are the same as those of the first embodiment.

A controlling portion 10 transfers a signal from the detecting portion 12 to the judging portion 17, and receives results of the judgment from the judging portion 17. When the judging portion 17 judges that there are abnormalities in the transporting unit, the controlling portion 10 controls an indicating portion 16 such that only a leading abnormal position among the abnormal positions is indicated.

When a control switch 3 is pushed, the controlling portion 10 receives a signal therefrom and drives the transporting unit to collect remaining bills into the predetermined place such as storages and a deposit port in the vicinity of the bill remaining positions. At this time, the controlling portion 10 drives the transporting unit at a lower speed than a normal speed to improve the safety of an operator who resolves the abnormalities.

An operation of the second embodiment will be described with reference to FIGS. 7 and 8A to 8C.

It is supposed that a leading jam position among many jam positions is a position 22 shown in FIG. 5. The position 22 corresponds to a monitoring unit 13, i.e., a position 4 on an indication panel 2. A sensor disposed at the position 22 detects the jam to send a detection signal to the judging portion 12 through the controlling portion 10.

The judging portion 12 judges according to the detection signal that the leading jam position is the position 22, and sends a judgment signal to the controlling portion 10.

Figure 8A:
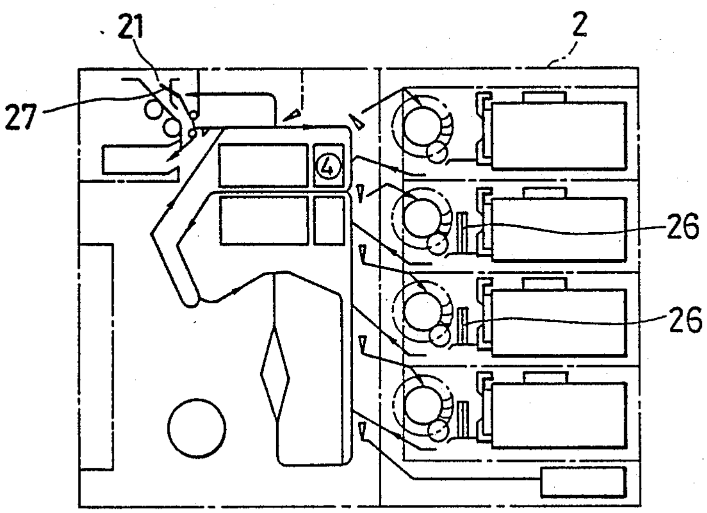
FIGS. 8A to 8C are front views showing a paper document transacting apparatus operated according to the control system shown in FIG. 7.

The controlling portion 10 controls the indicating portion 16 according to the judgment signal such that a light emitting diode 6 of the position 4 on the indication panel 2 is cyclically turned on and off while other light emitting diodes 1 to 3 and 5 to 17 are kept off as shown in FIG. 8A. At this time, a numeric indicating portion 7 indicates a numeral "4".

Figure 8B:
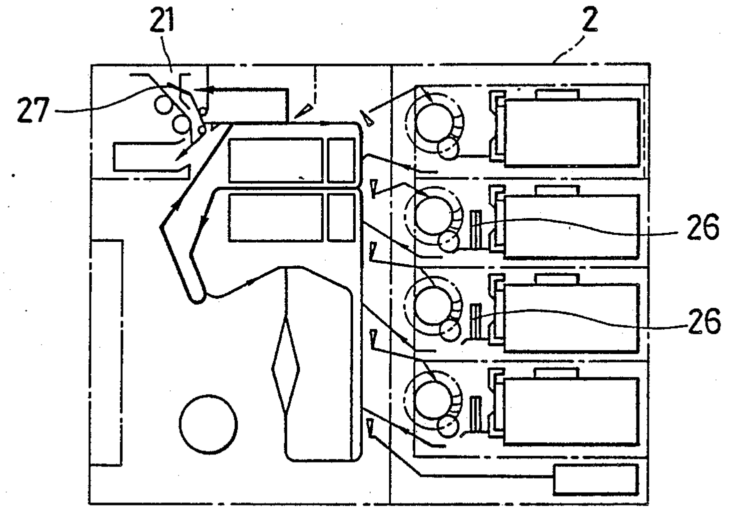

Then, an operator quickly opens an inspection door 8 of the monitoring unit 13 to remove jammed bills. At this time, the transporting unit is stopping. After removing the jammed bills, the operator may push the control switch 3 to drive the transporting unit at a low speed by the control of the controlling portion 10 to collect remaining bills into the predetermined place. On the indication panel 2, a state is indicated that bills 26 remaining in the vicinity of the respective storages are collected into a 5,000-yen bill storage 23, 1,000-yen bill storage 24 and a 10,000-yen bill storage 25, while bills 27 remaining in the vicinity of a deposit port 21 are collected into the deposit port 21, as shown in FIG. 8B.

Figure 8C:
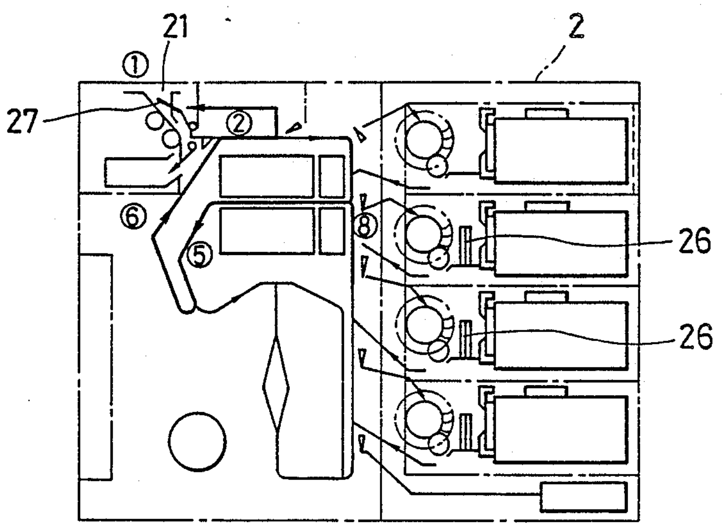

When the switch 3 is operated, the indicating portion 16 is controlled such that the light emitting diodes 6 at the positions 8, 5, 6, 2 and 1 are turned on as shown in FIG. 8C. Accordingly, the operator can see a collecting state of the remaining bills while pushing the switch 3 and confirm whether or not the bills are left in the transporting unit.

Under this state, the light emitting diode 6 of the position 4 is turned off, and the number indicated on the numeric indicating portion 7 is also turned off.

After releasing the switch 3, the operator removes the collected bills from the collecting positions, completing the jam correcting process. After that, the operator may push a reset button (not shown) to restart the normal operation of the paper document transacting apparatus.

In the embodiment of the present invention mentioned in the above, only a leading abnormal position is indicated, and a transporting unit is driven at a low speed by the operation of a control switch. Therefore, abnormalities can quickly be resolved without opening many inspection doors which tend to be left open as in the case of the prior art.

Figure 9:
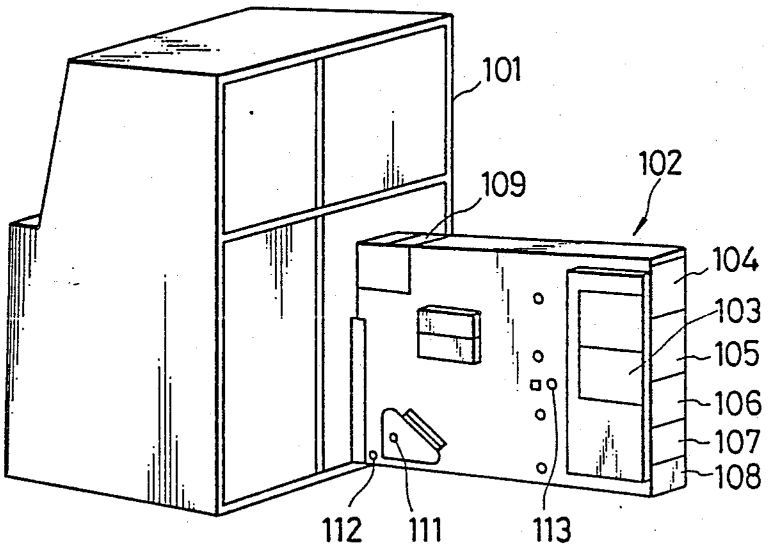
FIG. 9 is a perspective view showing a third embodiment of the present invention.

FIG. 9 is a view showing a paper document transacting apparatus according to a third embodiment of the present invention.

Figure 10:
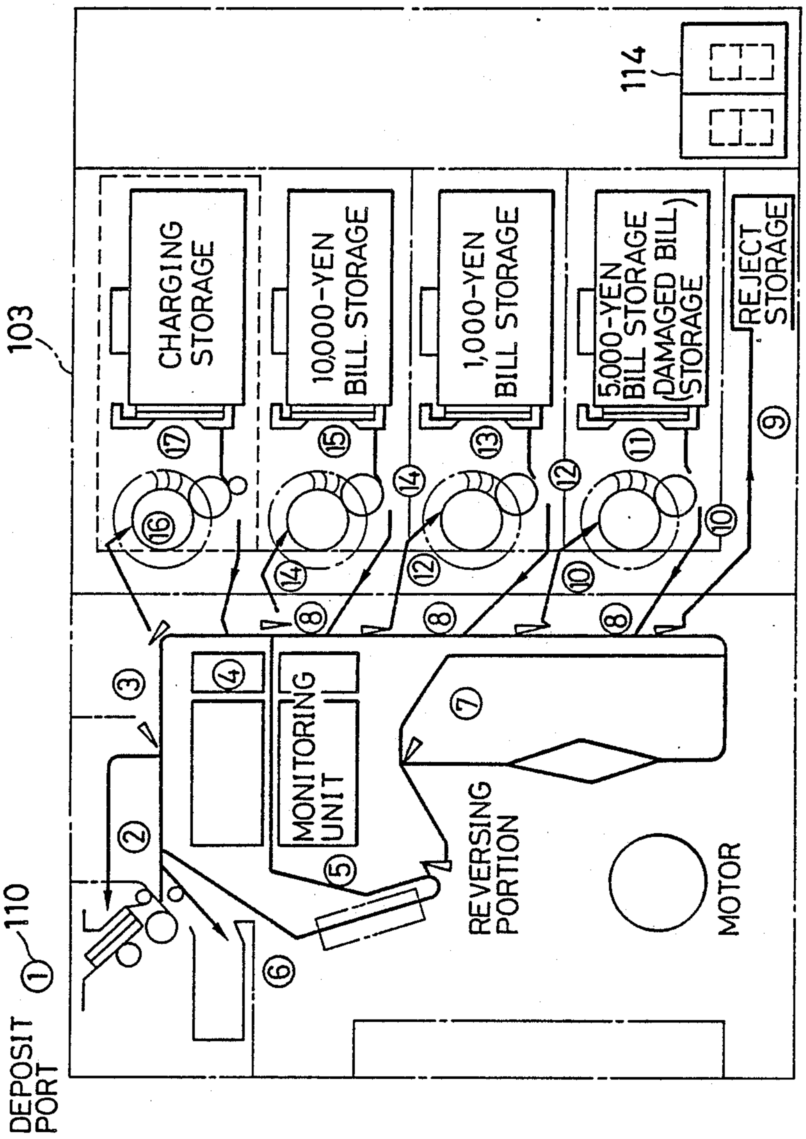
FIG. 10 is an enlarged plan view showing an indication panel of the third embodiment.

In the figure, a numeral 101 represents a paper document transacting apparatus to which a transporting unit 102 is removably inserted. As shown in FIGS. 9 and 10, the transporting unit 102 comprises an indication panel 103. The transporting unit 102 further comprises a monitoring unit, a reversing portion, a driving portion such as an AC motor, a charging storage 104, a 10,000-yen bill storage 105, a 1,000-yen bill storage 106, a 5,000-yen bill storage (a worn bill storage) 107 and a reject storage 108, whose patterns are indicated on the indication panel 103. A deposit port 109 is disposed in an upper part of the apparatus 101.

On the side of the transporting unit 102, there are arranged, in addition to the indication panel 103, first, second and third switches 111, 112 and 113 to be described later.

The details of the indication panel 103 will be described with reference to FIG. 10. The indication panel 103 indicates a pattern of the transporting unit 102 as well as patterns and letters representing the monitoring unit, motor and storages. The panel 103 is provided with a plurality of indication elements 110 such as light emitting diodes (represented by numerals 1 to 17 respectively) which are turned on when corresponding positions cause abnormalities. Sensors are disposed in the apparatus 1 at corresponding positions of the indication elements 110.

At an end of the indication panel 103, there is disposed a numeric indicating portion 114 comprising seven segments of liquid crystal or light emitting diodes.

If bills are jammed in the transporting unit 102, a jam position is detected by the detecting portion which generates a detection signal. According to the detection signal, one indication element 110 corresponding to the jam position is turned on on the indication panel 103 while a number corresponding to the jam position is indicated on the numeric indicating portion 114.

Figure 11A:
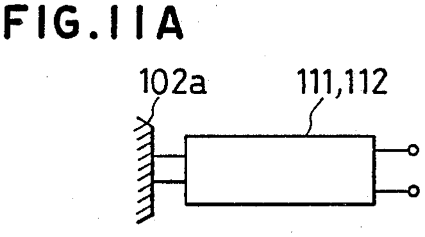
FIG. 11A to 11C are views explaining operating states of first and second switches provided for a transporting unit of the third embodiment.
Figure 11B:
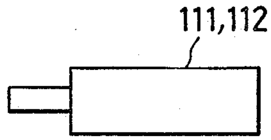
Figure 11C:
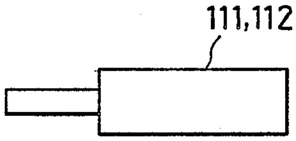

As shown in FIGS. 11A to 11C, the first and second switches 111 and 112 are of an interlock type and each has one OFF position and two ON positions. While the transporting unit 102 is received in the apparatus 101 with the first and second switches 111 and 112 being in contact with a frame 102*a*, the switches are in an ON state as shown in FIG. 11A. When the transporting unit 102 is pulled out of the apparatus 101, the switches are in an OFF state as shown in FIG. 11B. While the transporting unit 102 is located outside the apparatus 101 and when an operator pulls the switches, the switches are in an ON state as shown in FIG. 11C.

Figure 12A:
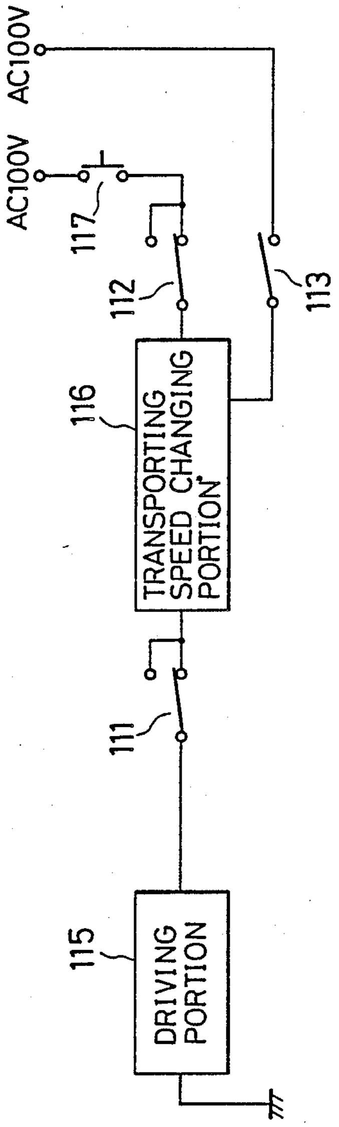
FIGS. 12A to 12E are views explaining power controlling states with respect to a driving portion of the transporting unit of the third embodiment.

FIG. 12A is an equivalent circuit including the first and second switches 111 and 112. The third switch 113 is turned on and off manually by the operator.

Referring to FIG. 12A, the wiring of a driving portion 115 of the transporting unit 102 and the first to third switches 111, 112 and 113 will be described.

The driving portion 115 is energized by a power source of, for instance, AC 100 V through a reset switch 117 of an interlock type, the second switch 112, a transporting speed changing portion 116 and the first switch 111. The third switch 113 is connected between the transporting speed changing portion 116 and a power source of, for instance, AC 100 V.

When the second switch 112 is turned on and the reset switch 117 is also on, the transporting speed changing portion 116 drives the driving portion 115 at a normal speed, while driving the driving portion 115 at a low speed when the third switch 113 is turned on. Namely, the third switch 113 has a function for instructing the driving portion 115 to operate at the low transporting speed.

In FIG. 12A, the transporting unit 102 is disposed in the apparatus 101 with the first and second switches 111 and 112 turned on the third switch 113 turned off.

An operation of the above arrangement will be described with reference to FIGS. 12B to 12E and 13.

It is supposed that a leading jam position in the transporting unit 102 is a position 4 on the indication panel 103 shown in FIG. 10. This position corresponds to the monitoring unit. A sensor disposed in the monitoring unit detects the jam and generates a detection signal. According to this detection signal, a numeral "4" is indicated on the numeric indicating portion 114 as shown in FIG. 10, and a light emitting element of the position 4 on the indication panel 103 is turned on.

Figure 12B:
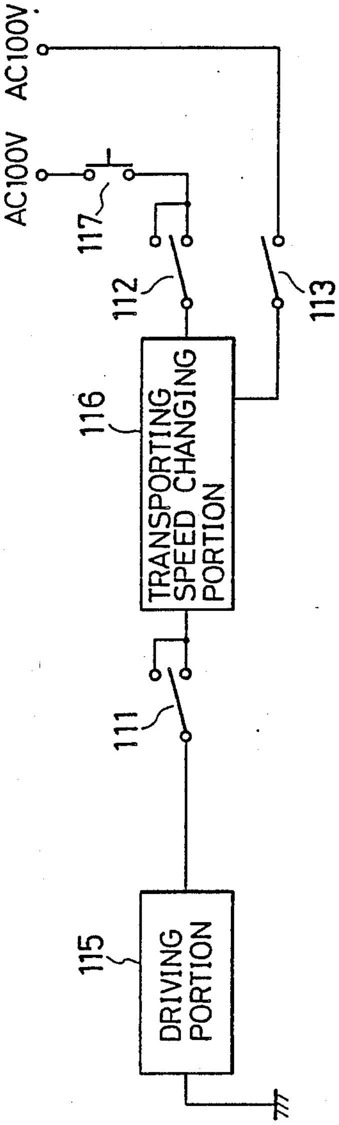

To solve the jam, an operator firstly pulls the transporting unit 102 out of the apparatus 101 (step ST1). At this time, the first and second switches 111 and 112 provided for the transporting unit 102 are turned off as described in the above and as shown in FIG. 12B. The third switch 113 is also in an OFF state.

While observing the number "4" on the numeric indicating portion 114, the operator opens the door of the monitoring unit to remove the jammed bills therefrom (step ST2).

Figures 12C, 12D, 12E:
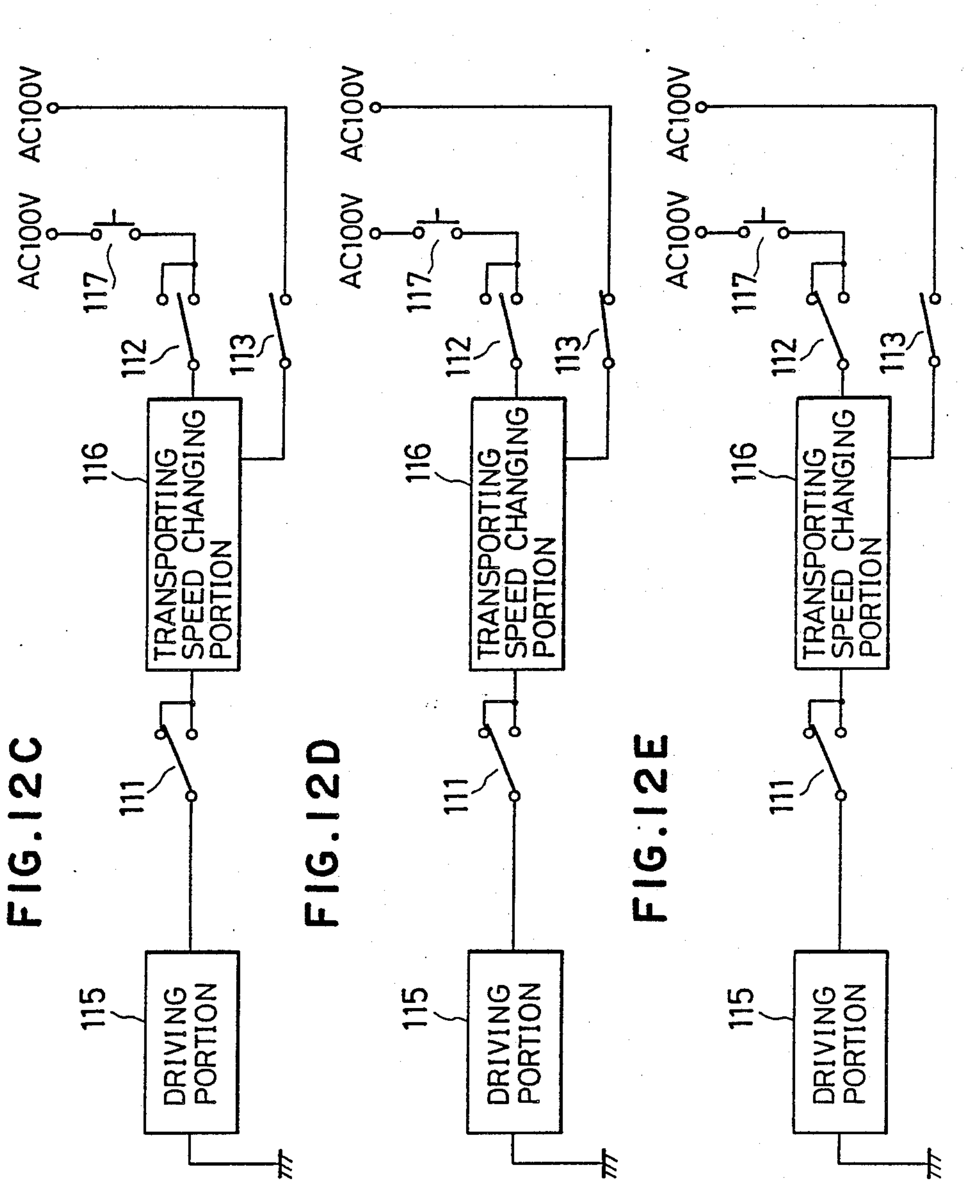
Figure 13:
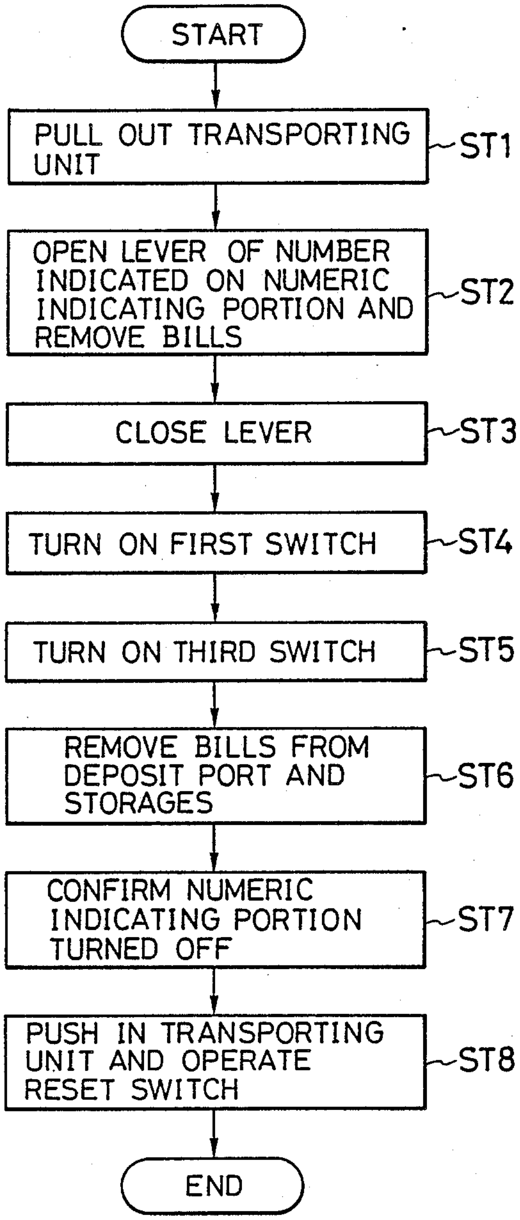
FIG. 13 is a flow chart showing jam correction sequences.

After that, the operator closes the door (step ST3), turns on the first switch 111 as shown in FIG. 12C (step ST4), and then turns on the third switch 113 for a predetermined time interval (for instance, 30 seconds) as shown in FIG. 12D (step ST5).

As a result, the driving portion 115 is energized by a power source via the third switch 113, transporting speed changing portion 116 and first switch 111. At this time, the transporting speed changing portion 116 is shifted to a slow speed mode. Then, the bills remaining in the transporting unit 102 are automatically transported to a deposit port 109 and storages at the low transporting speed.

After that, the operator removes the bills from the deposit port 109 and storages (step ST6), and confirms that the number on the numeric indicating portion 14 has disappeared (step ST7). Thus, the jam correcting process has been completed.

While the jam correcting process is being carried out, the second switch 112 is kept off as shown in FIGS. 12B to 12D so that the transporting speed changing portion 116 is not changed to a normal transporting speed mode even if the reset switch 117 is mistakenly turned on. Accordingly, the safety of the operator during the correction process can be secured.

After that, the operator inserts the transporting unit 102 into the apparatus 101, and operates the reset switch 117 to restore the normal operation of the apparatus 101 (step ST8).

If the operator intends to perform, instead of the jam correction, a performance test of the transporting unit, the operator pulls out the transporting unit 102, turns on the first and second switches 111 and 112 as shown in FIG. 12E, and operates the reset switch 107. Then, the transporting unit 102 is operated in the normal transporting mode in which it is located within the apparatus 101.

The present invention is not limited to the embodiments mentioned in the above, but many modifications thereof are possible. For instance, the apparatus of the present invention is applicable for various bills, notes and sheets.

As described in the above in detail, the present invention provides a paper document transacting apparatus which is safe and effective in correcting transport abnormalities, if they occur.

What is claimed is:

1. An automatic transacting apparatus, comprising:

a plurality of storage compartments;

transporting means for storing and extracting paper documents into/from said storage compartments;

means for detecting a delivery malfunction of the transporting means when documents have not been transported correctly;

means for indicating the position of the document in the transporting means when a malfunction has occured;

switch means for generating a reset control signal for controlling the operation of said transporting means; and means for controlling said transporting means such that said transporting means is driven at a low speed after detection of a malfunction of said transporting means when a signal from said switching means is received at said controlling means.

2. An automatic transacting apparatus as claimed in claim 1, wherein said control means controls said transporting means such that the remaining paper document is collected into a predetermined place while said transporting means is driven at said slow speed.

3. An automatic transacting apparatus as claimed in claim 1, wherein said control means controls said indicating means so as to indicate the position of remaining paper documents from said leading malfunctioning position by the activation of said switch means.

4. An automatic transacting apparatus as claimed in claim 1, wherein said control means collects the remaining paper documents transferred by the transporting means into a predetermined place according to said signal from the switch means.

5. An automatic transacting apparatus, said apparatus comprising:

a plurality of storage compartments, means for detecting a transporting position of the paper document;

means for judging according to the detected result from said detecting means whether or not a delivery malfunction of the transporting means exists;

means for indicating the transporting position of the paper document that has not been transported correctly;

switch means for generating a reset control signal, means for controlling said transporting means so that when said judging means have indicated a malfunction said transporting means is driven at a low speed according to the control signal from said switch means to collect the paper documents remaining in said transporting means into a predetermined place.

6. An automatic transacting apparatus as claimed in claim 5, wherein said control means controls the indicating means so as to indicate the position of said remaining paper documents during the collection of said remaining paper documents.

7. An automatic transacting apparatus as claimed in claim 6, wherein said control means controls the indicating means so as to indicate the leading abnormal transport position and the position of the remaining paper documents in different modes.

8. An automatic transacting apparatus as claimed in claim 7, wherein said indicating means indicates the leading abnormal transport position in a flashing mode and the position of the remaining paper document in a steady mode.

9. An automatic transacting apparatus comprising:

transporting means for transporting a paper document in one of two conditions, in the first condition said transporting means being stored within the apparatus and in the second condition said transporting being pulled out and separated from the apparatus;

means for driving said transporting means;

switch means in said transporting means for detecting whether said transporting means is in the first or second condition; and reset switch means for instructing said driving means to transfer the paper document at a low speed.

10. An automatic transacting apparatus as claimed in claim 9, wherein, when the transporting means is pulled out of the apparatus body, the first and third switch means are turned on to drive the transporting means at the low speed by the drive means while the second switch means turned off to disregard external operating instructions given to the driving means.

11. An automatic transacting apparatus as claimed in claim 10, further comprising a transporting speed changing portion connected to the driving means through the first switch means.

* * * * *